June 2, 1925.  1,539,981

R. H. WILLIAMS

BUMPER

Filed July 28, 1924

Inventor

Ralph H. Williams,

By

Attorneys

Patented June 2, 1925.

1,539,981

UNITED STATES PATENT OFFICE.

RALPH H. WILLIAMS, OF DETROIT, MICHIGAN.

BUMPER.

Application filed July 28, 1924. Serial No. 728,562.

*To all whom it may concern:*

Be it known that I, RALPH H. WILLIAMS, a citizen of the United States, residing at Detroit, in the county of Wayne and State of Michigan, have invented certain new and useful Improvements in Bumpers, of which the following is a specification, reference being had therein to the accompanying drawings.

This invention relates to bumpers for the protection of vehicles against damage by collision of similar impacts, and has for its object to provide a form of bumper which may be simply and cheaply constructed whilst being very efficient in operation and in which the bumper strips or fenders proper of the bumper are arranged to offer a common resistance to the yielding severally of the said strips under the action of impact.

It is also an object to provide in such bumper strips, end portions adapted to flexion relative to fulcrums common to such strips and having the ends of said flexible portions movable in arcs varying as to radius whereby opposing forces are set up on such flexion tending to maintain the said strips in undisturbed relation.

A still further object is to provide a bumper wherein the fender proper thereof is provided with a plurality of bowed flexible arms of different curvature or angularly disposed relative to the plane of the fender proper, linked to a supporting frame in such manner that the extremities of said arms are movable about the extremities of said frame in arcs of different radius.

Still further objects subsidiary to or resulting from the aforesaid objects, or from the construction or operation of the invention as it may be carried into effect, will become apparent as the said invention is hereinafter further disclosed.

In carrying the said invention into effect, I may provide as a frame a bar adapted to be secured to any desirable part of a vehicle, said bar having flexible extensions on the ends thereof in the form of links hingedly connected to the ends of the said frame, and the fender proper also having flexible end portions or arms such as flexible extensions of bumper strips forming the said fender, which arms are of differing lengths and attached to the said links at varying distances from the fulcrums of the said links in such manner that the ends of the said arms are movable about the said fulcrums in arcs of varying radius. The said arms extend rearwardly of the front of the said fender proper whereby the said fender is substantially spaced forwardly of the frame and whereby, due to their varying lengths and relative disposition on the said links, resistance between the said arms to the movement thereof by pressure against the said fender proper is secured. All of which is more particularly described and ascertained hereinafter, by way of example, having reference to the accompanying drawing, wherein—

Similar characters of reference indicate similar parts in the several figures of the drawing.

Figure 2:
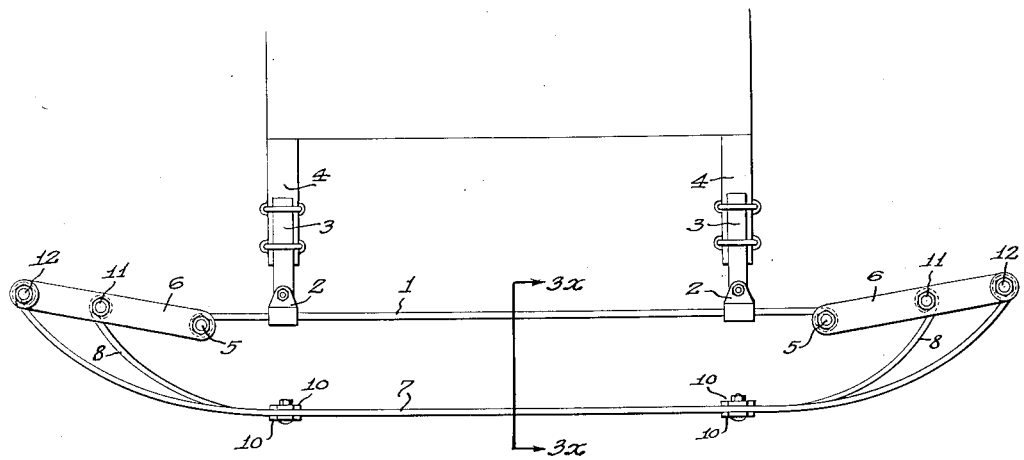
Figure 2 is a plan view of the same illustrating its application to a vehicle.
Figure 1:
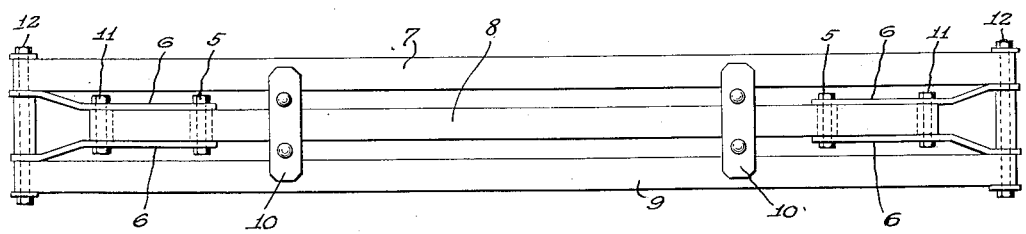
Figure 1 is a front elevation of a bumper embodying said invention.
Figure 3:
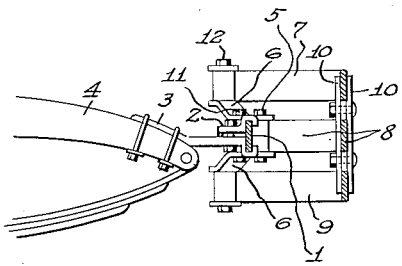
Figure 3 is a transverse section of the same taken on the line 3×—3× of Figure 2.

1 is a bar forming a bumper frame which is attached by means of clamps 2 having arms 3 to the ends 4 of a vehicle frame in any suitable manner, the said bar 1 being preferably substantially rigid although it may be slightly flexible if it be desired to use a material having that characteristic. The ends of the bar are bent to accommodate pintles 5 to which are secured links 6 forming extensions of the said frame 1 and being, by reason of their hinged nature, in the form of flexible extensions of the said bumper frame capable of being swung backwards and forwards on the said pintles 5.

Spaced forwardly of the said frame 1 is a fender proper which comprises a plurality of bumper strips, in this case three strips 7, 8 and 9, secured together by connecting strips 10 whereby the intermediate portions of the said strips lie in an approximately common plane and form a guard adapted to resist the impact of a colliding vehicle or object. The strips 7 and 9 are longer than the strip 8 and all of the said strips are bowed or offset at their end portions toward the links 6, the said offset portion of the said strips being flexible to the extent that they may under stress have their degree of curvature increased or decreased according to the direction of pressure exerted thereon.

The ends of the said strips are connected to the flexible extensions or links of the frame 1 at different distances from the pintles 5 whereby the end portions of the strip 8 are offset at a sharper angle to the intermediate part thereof than are the end portions of the other strips whereby, upon movement of the fender proper relative to the bumper frame such as upon impact, the ends of the strips 7 and 9 will travel through arcs of greater radii than the ends of the strips 8 and result in a variation of the angle between the respective end portions of the long and short bumper strips. In this way opposed forces are set up in the ends of the said strips when the fender proper is moved by being subjected to pressure as in the case of collision, and a consequent tendency to maintain the fender in its normal relation to the frame is maintained.

11 and 12 indicate the pintles connecting the short and the long bumper strips respectively to the links 6.

The relative arrangement of the fender having the ends of the strips forming arms of differing lengths and angular disposal connected to flexible extensions of the frame provides a very strongly reinforced bumper which is free from a multiplicity of parts and positive in its action, and which is capable of offering a substantial cushioned resistance to an impacting object with a yielding of the fender proper as a whole in such manner that tendency of the fender proper to be permanently distorted is greatly reduced.

This invention may be developed within the scope of the appended claims without departing from the essential features of the invention, and it is desired that the specification and drawing be read as being merely illustrative and not in a limiting sense, except as necessitated by the prior art.

What I claim is:—

1. In a device of the character described, a frame, a fender having a plurality of flexible arms at the ends thereof, and links hingedly extending from the ends of said frame to which links the extremities of said arms are connected at differing distances from the hinged ends of said links.

2. In a device of the class described, a frame, a fender having a plurality of flexible arms of differing lengths at the ends thereof, and fender connecting means fulcrumed to said frame, said arms being connected to said means at varying distances from the fulcrums thereof.

3. In a device of the class described, a frame having hinged end portions, a flexible bowed member connecting the ends of said end portions together, and a similar member connecting said end portions together intermediate of their length, said members being arranged in forwardly spaced relation to said frame.

4. A device according to claim 3, wherein the connections of said end portions to said members are in the form of pintles about the axes of which the ends of said members may slightly rotate.

5. A device according to claim 3, wherein the members lie in an approximately common plane throughout the intermediate part of their length and are connected together to retain them in such relation.

6. In a device of the class described, a frame, bowed bumper strips of varying length and all of greater length than said frame, and hinged members at the ends of said frame to which the ends of said strips are attached.

7. In a device of the class described, a frame, bowed bumper strips of varying length and all of greater length than said frame, and hinged members at the ends of said frame, the ends of said strips being linked by common means to the ends of said frame.

In testimony whereof I affix my signature in presence of two witnesses.

RALPH H. WILLIAMS.

Witnesses:
ANNA C. RAVILER,
G. E. McGRANN.